Sept. 19, 1967  M. C. STEELE  3,342,438
ENGINE MOUNTING MEANS

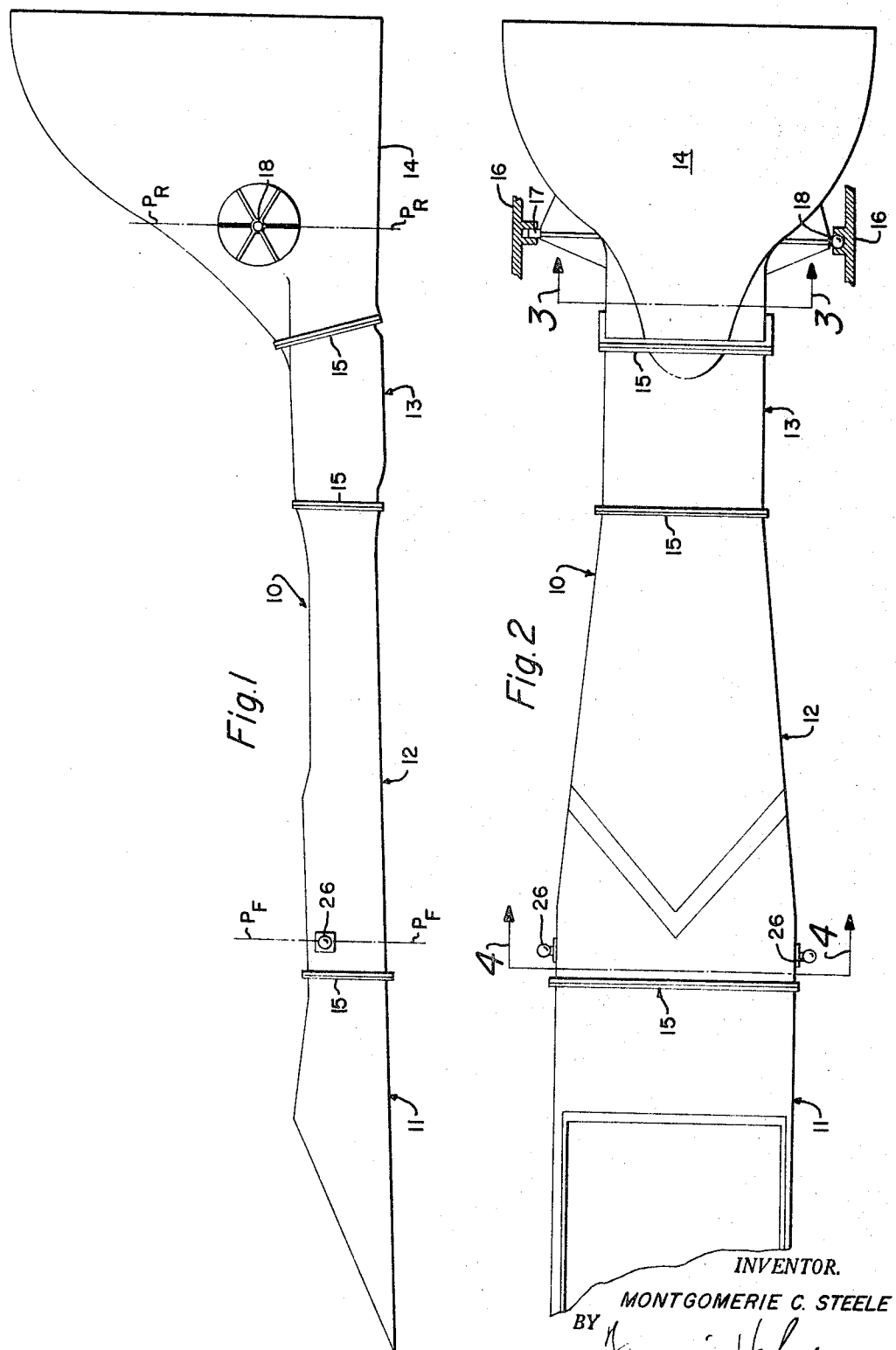

Filed March 24, 1961  3 Sheets-Sheet 2

INVENTOR.
MONTGOMERIE C. STEELE
BY
ATTORNEY

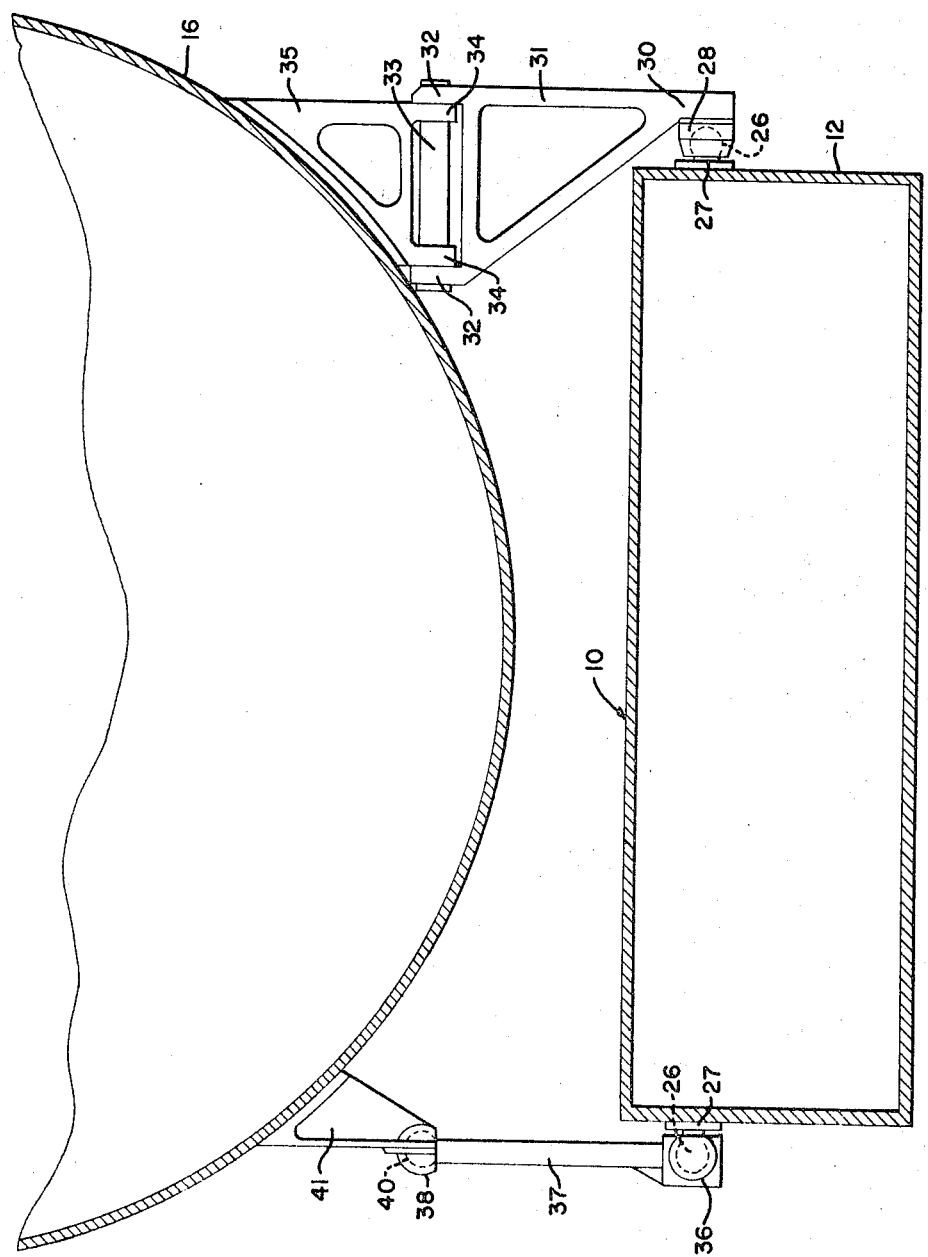

United States Patent Office 3,342,438
Patented Sept. 19, 1967

3,342,438
ENGINE MOUNTING MEANS
Montgomerie C. Steele, Phoenix, Ariz., assignor to The Garrett Corporation, Los Angeles, Calif., a corporation of California
Filed Mar. 24, 1961, Ser. No. 98,066
3 Claims. (Cl. 244—54)

This invention relates to engine mounting means and aims to provide a unique and effective mounting arrangement for a detonation combustion engine which is used to produce a propulsive thrust for the cruising phase in the flight of a hypersonic aircraft.

In aircraft which are designed for flight at hypersonic speeds (Mach number above 5.0), both the airframe and engine are subjected to extreme stresses primarily because of high aerodynamic loading. In addition, the temperature gradients in the engine are high relative to the airframe and create thermal stresses which require consideration. Therefore, in mounting a detonation combustion engine in the airframe, care must be taken to minimize the stresses induced by differential thermal expansion and load deformations of the engine structure relative to the airframe. This invention is based on the discovery that a mounting means for an elongated detonation combustion engine is possible which transmits engine thrust to the airframe, yet allows complete freedom of expansion of the engine in all directions.

In accordance with this invention, a mounting system for suspending a detonation combustion engine in a suitable hypersonic airframe is provided and consists essentially of two mounting means located in a transverse plane at the exhaust nozzle of the engine and two mounting means in a second transverse plane immediately downstream of the inlet section of the engine, said transverse planes being substantially perpendicular to the longitudinal axis extending from the inlet to the exhaust of the engine. More particularly, one of the mounting means at the nozzle may be a ball connection rigidly connected to the airframe, while the other may be a trunnion mount also rigidly tied to the airframe. In the transverse plane adjacent the inlet, one mounting means is a ball joint connected by a supporting arm to a pin mount on the airframe so as to allow freedom to expand longitudinally, but loads may be transmitted to the frame in both vertical and lateral directions. The other mounting means in the plane adjacent the inlet may be a ball joint connected through a structure to a suitable ball joint on the airframe so as to take out or transmit loads only in a vertical direction.

It is an object of this invention to provide an effective means for mounting an elongated detonation combustion engine in the airframe of a hypersonic aircraft.

Another object of the invention is to provide an arrangement for mounting a detonation combustion engine in an airframe wherein the mounting means are in two planes transverse to the longitudinal axis of the engine and in which such means are adapted to transmit forces from a plurality of directions to the airframe.

Another object of the invention is to provide an arrangement for mounting a detonation combustion engine in an airframe wherein the mounting means are in two planes transverse to the longitudinal axis of the engine and there are two mounting means in each plane.

Another object of the invention is to provide an arrangement for mounting a detonation combustion engine in an airframe wherein the mounting means are in two planes transverse to the longitudinal axis of the engine and in which the mounting means in one plane is adapted to limit longitudinal movement of the engine and the mounting means in the second plane allows movement in a plurality of directions.

Still another object of the invention is to provide a construction for mounting a detonation combustion engine in an airframe wherein there are four mounting means arranged in pairs in two planes transverse to the longitudinal axis of the engine, the mounting means in one plane removing both longitudinal and lateral loads, one mounting means in the other plane removing lateral loads, and vertical loads being removed at all four mounting means.

The above and other features and objects of the invention will be apparent from the following description and the accompanying drawings, in which:

FIG. 1 is a side elevational view of a detonation combustion engine showing the longitudinal positions of the mounting means embodying the principles of this invention;

FIG. 2 is a plan view of the engine shown in FIG. 1, together with fragmentary portions of the airframe in which the engine is mounted;

FIG. 4 is a vertical transverse sectional view on the plane indicated by the line 4—4 of FIG. 2, the view including additional details of the mounting means and the airframe.

Figure 3:
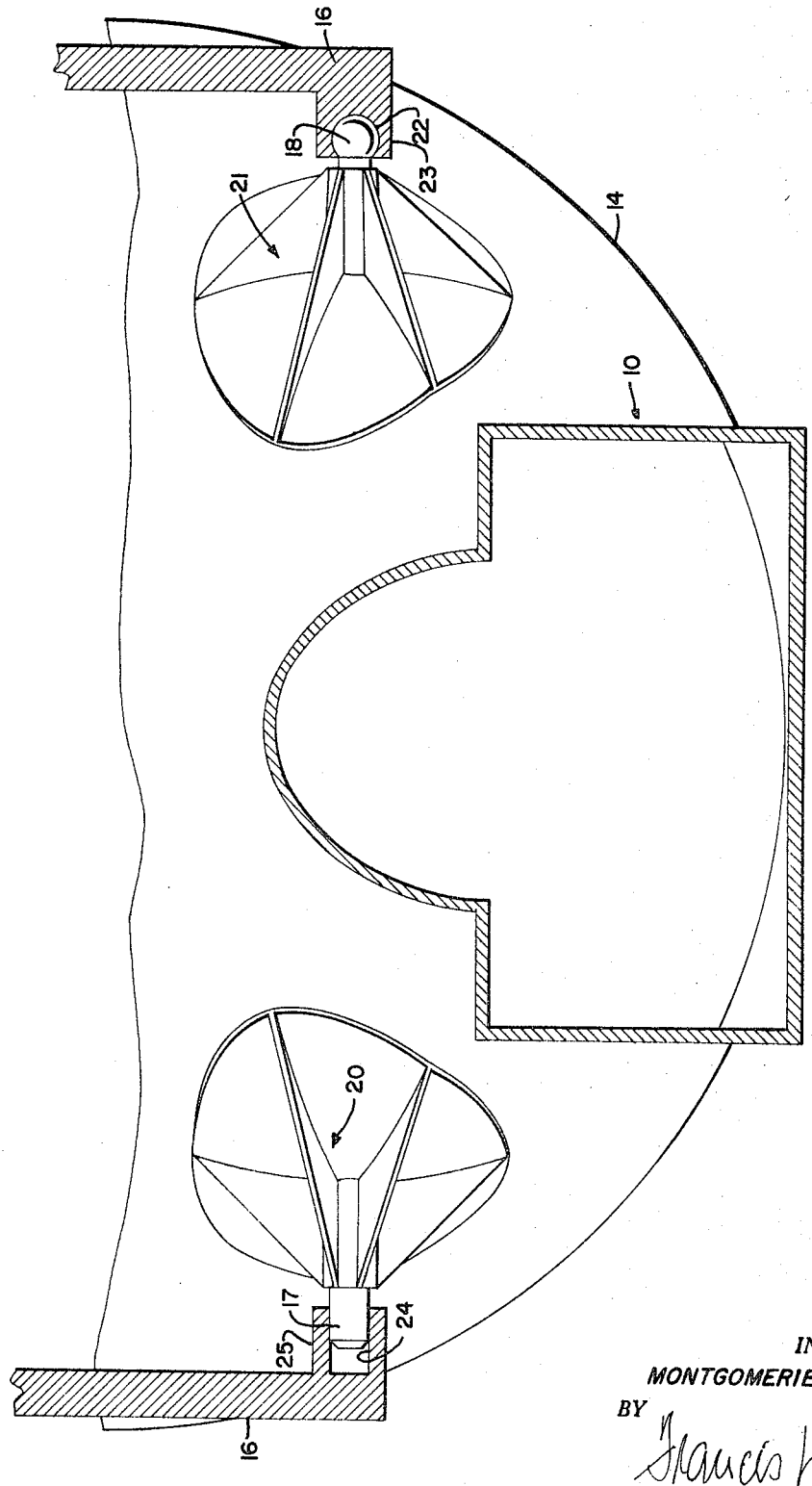
FIG. 3 is view partly in elevation and partly in vertical section, taken along the line 3—3 of FIG. 2.

A hypersonic aircraft and detonation combustion engine of the type contemplated by the present invention are disclosed in the copending application of Hunter and Norman, Ser. No. 88,149, filed Feb. 9, 1961. In the detonation combustion process, the flamefront or detonation is established and maintained in the engine duct by the temperature rise occurring across a shock wave, rather than being advanced by heat conduction as is the case in conventional internal combustion processes such as occur in ramjet and turbojet engines. This difference in the combustion process, together with the increased velocity of airflow (above Mach 5.0) and the overall length of the engine (about 30 feet), tend to aggravate the stress problems caused by expansion and contraction of the engine. According to this invention, all such stresses are properly and adequately distributed to the frame with no redundancy, that is, with the least number of supporting points and repetition of the manner of handling forces in any particular direction.

As shown in FIGS. 1 and 2, the detonation combustion engine, which is designated generally by the reference numeral 10 and is described in detail in the above-referred-to Hunter and Norman application, comprises an elongated aerothermodynamic duct including an inlet section 11, a mixing section 12, a combustor section 13, and an exhaust nozzle 14. Each of these sections, except the nozzle 14, is rectangular in cross section and is suitably flanged, as at 15, for attachment to the section adjacent to it in any convenient manner that will provide fluid-tight joints. The center of gravity of the engine 10 is slightly to the rear or downstream of its actual or physical center, and the placement of the mounting means is such as to distribute the vertical loads substantially uniformly into the airframe and keep any bending moments at a minimum.

It has been found that the engine 10 may be suspended in an airframe 16 of the desired configuration for hypersonic flight by an integrated set or system of mounting means. In the form shown, the mounting means are arranged in two transverse planes, as shown in FIG. 1, and such planes are spaced from the ends of the duct and approximately equidistant from the center of gravity of the engine. The first of these planes is a rearward or nozzle plane, indicated by the dot-and-dash line $P_R$—$P_R$, and the second is a forward or inlet plane, indicated by the dot-and-dash line $P_F$—$P_F$. Each plane includes two mounts, making a total of four for the engine, and each of the four mounts is different functionally, as will now be described. Taken together, however, the four mounts provide mounting means of maximum efficiency for the detonation combustion engine.

In FIGS. 2 and 3, it will be observed that the nozzle mounts in plane $P_R$—$P_R$ comprise a trunnion 17 and a ball 18 which are suitably attached to the curved outer surface of the exhaust nozzle 14 by special webbed or reinforced fittings 20 and 21, respectively. These reinforced fittings are designed to support the associated mount and feed the stresses from the rear portion of the engine thereto. Ball 18 rests or rides in a correspondingly shaped and sized socket 22 formed in a lug 23 provided in proper position on the airframe 16. This mount is thus fixed to the airframe, but through the ball and socket allows for movement of the engine in a plurality of directions with respect to the frame. Trunnion 17 is mounted in a cylindrical opening or bore 24 formed or machine in a lug 25 provided in proper position on the airframe; or, alternately, the opening 24 may be directly through the airframe member 16, a nut (not shown) being used on a threaded end of the trunnion 17 to hold the parts in position while still allowing some lateral movement of the engine. It will be noted that the bore 24 and the length and position of the trunnion 17 are such as to permit some lateral movement of the engine, but the engine is fixed in this plane against vertical and longitudinal movement with respect to the airframe. It should be noted also that the engine can rotate about a transverse axis containing the center of the ball and the axis of the trunnion.

Referring now to the forward end of the engine and plane $P_F$—$P_F$, it will be noted in FIGS. 2 and 4 that a ball mount 26 is provided on each side wall of the upstream end of the mixing section 12 and rigidly attached thereto by a suitable support and base 27. The ball on the same side of the engine as the ball 18 is arranged for movement in a plurality of directions in a socket member 28 formed on or attached to the lower end 30 of a triangular supporting arm 31. The base of the supporting arm 31 has a pair of lugs 32 which are arranged to receive a pin 33 also passing through a pair of lugs 34 formed on the end of a downwardly extending support 35 rigidly attached to the airframe 16. Such a pin connection of the ball and socket joint 26–28 to the frame allows for longitudinal movement of the forward end of the engine with respect to the airframe.

At the other side of the engine, ball 26 is mounted in a suitable socket member 36 formed on the lower end of a supporting arm 37 which has a ball 38 at the upper end thereof. A second ball and socket joint is provided at this side of the engine by mounting ball 38 in a socket 40 which is formed in a fitting or support 41 rigidly attached to the airframe. The construction of this particular mount allows movement of the engine in both longitudinal and lateral directions with respect to the airframe.

From the foregoing, it will be understood that the mounting means described above allows the engine to distort or expand in all directions with respect to the airframe without causing the introduction of redundant loads between the engine and the airframe. Longitudinal loads are taken out (transmitted to the airframe) in the rear or nozzle plane at the ball 18 and trunnion 17. Lateral loads are removed at the rear plane at ball 18 and at the forward plane at ball 27. Vertical loads are taken out at all four mount points.

Various changes may be made in the construction and certain features may be employed without others without departing from this invention or sacrificing any of its advantages.

I claim:
1. A mounting system for operatively connecting an elongated detonation combustion engine to an airframe, said engine having an air inlet and an exhaust nozzle, such mounting system comprising: a first pair of mounting means adjacent said exhaust nozzle, one of said mounting means including a ball element and socket element swively receiving the ball element and the other including a trunnion element and a bearing element slidably and rotatably receiving the trunnion element, one element of each mounting means being rigidly connected to the airframe and the other element of each mounting means being rigidly connected to said engine; and a second pair of mounting means adjacent said inlet, one of said mounting means of said second pair including a ball and socket between the engine and a supporting arm, and a ball and socket between said supporting arm and said airframe, and the other of said mounting means of said second pair including a ball and socket between the engine and a second supporting arm and a trunnion connection between said arm and said airframe.

2. A mounting system for operatively connecting an elongated engine to an airframe, comprising: a pair of first mounting means straddling one end of said engine and a pair of second mounting means straddling the other end of said engine; said first mounting means including means for restraining said engine against bodily endwise and lateral movement with respect to said airframe while accommodating lateral thermal expansion and contraction of said engine; one of said second mounting means including an arm hinged at one end to said airframe on a fixed axis extending laterally of the engine and a pivotal connection between the other end of said arm and said engine, and the other second mounting means including a second arm having a universal swivel connection with said airframe at one end and a universal swivel connection with said engine at the other end, whereby said second mounting means accommodate both longitudinal and lateral thermal expansion and contraction of said engine.

3. A mounting system for operatively connecting an elongated engine to an airframe, comprising: a pair of first mounting means straddling one end of said engine and a pair of second mounting means straddling the other end of said engine; one of said first mounting means including an axially movable pivot connection between said airframe and engine having its pivot axis extending laterally of the engine and the other first mounting means including a universal swivel connection between said airframe and engine and disposed on said axis; one of said second mounting means including an arm hinged at one end to said airframe and a universal swivel connection between the other end of said arm and said engine, and the other second mounting means including a second arm having a universal swivel connection with said airframe at one end and a universal swivel connection with said engine at the other end, whereby said second mounting means accommodate both longitudinal and lateral thermal expansion and contraction of said engine, the connections between said arms and said airframe being located on a common pivot axis parallel to said first axis and the connections between said arms and said engine being located on a common pivot axis also parallel to said first axis.

References Cited

UNITED STATES PATENTS

| 2,516,671 | 7/1950 | Bowers et al. | |
| 2,564,042 | 8/1951 | Walker | 60—35.6 |
| 2,580,207 | 12/1951 | Whittle | 60—35.6 |
| 2,722,801 | 11/1955 | Lombard | 60—35.6 |
| 2,968,920 | 1/1961 | Wayne | 60—39.32 X |
| 3,004,388 | 10/1961 | Foulon | 60—35.6 X |

MILTON BUCHLER, *Primary Examiner.*

ARTHUR M. HORTON, SAMUEL BOYD,
*Examiners.*

R. F. STAHL, *Assistant Examiner.*